United States Patent
Funahashi et al.

(10) Patent No.: US 10,732,742 B2
(45) Date of Patent: Aug. 4, 2020

(54) INFORMATION PROCESSING PROGRAM AND METHOD FOR CAUSING A COMPUTER TO TRANSFORM A DISPLAYED OBJECT BASED ON INPUT AREA AND FORCE OF A TOUCH INPUT

(71) Applicant: Nintendo Co., Ltd., Kyoto (JP)

(72) Inventors: Kiyofumi Funahashi, Kyoto (JP); Yasumasa Miyoshi, Kyoto (JP); Hiroki Takuma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 53 days.

(21) Appl. No.: 15/825,873

(22) Filed: Nov. 29, 2017

(65) Prior Publication Data

US 2018/0081461 A1    Mar. 22, 2018

Related U.S. Application Data

(63) Continuation of application No. 13/680,948, filed on Nov. 19, 2012, now abandoned.

(30) Foreign Application Priority Data

Dec. 28, 2011  (JP) ................................ 2011-287725

(51) Int. Cl.
*G06F 3/041* (2006.01)
*G06F 3/0488* (2013.01)

(52) U.S. Cl.
CPC .......... *G06F 3/041* (2013.01); *G06F 3/04883* (2013.01)

(58) Field of Classification Search
CPC .... G06F 3/0414; G06F 3/0481; G06F 3/0482; G06F 3/0484; G06F 3/0487; G06F 2203/04105; G06F 3/041–3/04883
See application file for complete search history.

(56) References Cited

U.S. PATENT DOCUMENTS

| | | | |
|---|---|---|---|
| 8,407,606 B1 | 3/2013 | Davidson et al. | |
| 8,477,115 B2 * | 7/2013 | Rekimoto | G06F 3/033 178/18.03 |

(Continued)

FOREIGN PATENT DOCUMENTS

| | | |
|---|---|---|
| EP | 1 736 856 A2 | 12/2006 |
| EP | 2 306 281 A2 | 4/2011 |

(Continued)

OTHER PUBLICATIONS

Extended European Search Report for corresponding European Patent Application No. 12192737.0 dated Sep. 11, 2017.

*Primary Examiner* — Temesghen Ghebretinsae
*Assistant Examiner* — Ivelisse Martinez Quiles
(74) *Attorney, Agent, or Firm* — Nixon & Vanderhye, P.C.

(57) ABSTRACT

An exemplary system includes: an information processing unit; a storage unit which stores information processed by the information processing unit; a touch panel which is a touch input unit which accepts a touch input; and an acceleration sensor equivalent to a force detection unit which detects a force applied to an apparatus or the touch panel at a time of the touch input, and the information processing unit evaluates an input area of the touch input and performs predetermined information processing in accordance with the input area and an acceleration value which is a detection value of the force.

17 Claims, 10 Drawing Sheets

(56) References Cited

U.S. PATENT DOCUMENTS

| | | | |
|---|---|---|---|
| 8,665,225 B2 | 3/2014 | Herz et al. | |
| 9,030,419 B1* | 5/2015 | Freed | G06F 3/0416 |
| | | | 345/173 |
| 2002/0163509 A1* | 11/2002 | Roberts | G06F 3/0414 |
| | | | 345/173 |
| 2006/0284858 A1 | 12/2006 | Rekimoto | |
| 2007/0070046 A1 | 3/2007 | Sheynblat et al. | |
| 2008/0062169 A1* | 3/2008 | Heesemans | G06F 3/0412 |
| | | | 345/420 |
| 2008/0084400 A1 | 4/2008 | Rosenberg | |
| 2008/0204427 A1* | 8/2008 | Heesemans | G06F 3/0414 |
| | | | 345/174 |
| 2009/0153495 A1* | 6/2009 | Chen | G06F 3/04847 |
| | | | 345/173 |
| 2010/0026647 A1* | 2/2010 | Abe | G06F 3/04883 |
| | | | 345/173 |
| 2010/0044121 A1 | 2/2010 | Simon et al. | |
| 2010/0149129 A1* | 6/2010 | Homma | G06F 1/1626 |
| | | | 345/174 |
| 2011/0050588 A1 | 3/2011 | Li et al. | |
| 2011/0050594 A1* | 3/2011 | Kim | G06F 3/04847 |
| | | | 345/173 |
| 2011/0050619 A1 | 3/2011 | Griffin | |
| 2011/0050629 A1 | 3/2011 | Homma et al. | |
| 2011/0057886 A1 | 3/2011 | Ng et al. | |
| 2011/0102354 A1* | 5/2011 | Fuyuno | G06F 1/1616 |
| | | | 345/173 |
| 2011/0134061 A1 | 6/2011 | Lim | |
| 2011/0175820 A1 | 7/2011 | Toba | |
| 2011/0221684 A1 | 9/2011 | Rydenhag | |
| 2011/0242029 A1 | 10/2011 | Kasahara et al. | |
| 2011/0291934 A1 | 12/2011 | Yang | |
| 2012/0038582 A1 | 2/2012 | Grant | |
| 2012/0054665 A1 | 3/2012 | Kano et al. | |
| 2012/0105358 A1 | 5/2012 | Momeyer et al. | |
| 2012/0139864 A1 | 6/2012 | Sleeman et al. | |
| 2013/0063389 A1 | 3/2013 | Moore | |
| 2013/0088434 A1 | 4/2013 | Masuda et al. | |

FOREIGN PATENT DOCUMENTS

| | | |
|---|---|---|
| EP | 2 390 772 A1 | 11/2011 |
| JP | 2000-163193 | 6/2000 |
| JP | 2006-268073 | 3/2005 |
| JP | 2005-143714 | 6/2005 |
| JP | 2006-345209 | 12/2006 |
| JP | 2008-508629 | 3/2008 |
| JP | 2010-020608 | 1/2010 |
| JP | 2010-093707 | 4/2010 |
| JP | 2011-53971 | 3/2011 |
| JP | 2011-138402 | 7/2011 |
| JP | 2012-048623 | 3/2012 |
| WO | WO 2006/013518 A2 | 2/2006 |

* cited by examiner

INFORMATION PROCESSING PROGRAM AND METHOD FOR CAUSING A COMPUTER TO TRANSFORM A DISPLAYED OBJECT BASED ON INPUT AREA AND FORCE OF A TOUCH INPUT

CROSS REFERENCE TO RELATED APPLICATION

This application is a continuation of U.S. patent application Ser. No. 13/680,948 filed Nov. 19, 2012 which claims priority to Japanese Patent Application No. 2011-287725, filed on Dec. 28, 2011, are incorporated herein by reference.

FIELD

The technology shown here relates to a computer-readable non-transitory storage medium, an information processing apparatus, an information processing system, and an information processing method which perform information processing in accordance with a user's operation.

BACKGROUND AND SUMMARY

Conventionally, there is an information processing apparatus with a touch panel which performs an operation by selecting a button representing s character, a symbol, and the like displayed on a screen of a display in accordance with an input performed on the touch panel by the user.

However, there is a problem that the conventional information processing apparatus simply uses various buttons or gesture inputs to realize various operations and cannot provide diversity to operations based on respective touch inputs performed on the touch panel. That is, the conventional information processing apparatus cannot provide a user interface which allows various operations.

Therefore, a first objective of the present technology is to provide a new user interface which allows various operations.

A second objective of the present technology is to provide a user interface which allows more intuitive operations.

To achieve the above objectives, the present technology has the following features.

An example of the present technology is a computer-readable non-transitory storage medium having stored therein a program which causes a computer of an information processing apparatus including a force detection unit which detects a force applied to the information processing apparatus to function as an evaluation unit and an information processing unit. The evaluation unit obtains a touch position from a touch input unit and evaluates an input area of a touch input. The information processing unit performs predetermined information processing in accordance with the input area and the force detected by the force detection unit.

Accordingly, various different operations can be performed in accordance with the contact area which is an input area on the touch input unit and the force applied to the apparatus and the like, and thereby a variety of operations by the touch input can be performed and convenience of the information processing apparatus can be improved.

The information processing unit may perform the predetermined information processing in accordance with the input area when the force is detected by the force detection unit and the detected force.

Accordingly, various different operations can be performed based on both of the contact area and the force applied to the apparatus and the like at the same point in time, and thereby a more intuitive operation can be performed.

The information processing unit may perform the predetermined information processing based on both of the input area and the detected force.

Accordingly, the predetermined information processing is performed based on both of the contact area and the force applied to the apparatus and the like, and thereby a wider variety of operations can be performed.

The information processing unit may perform the predetermined information processing based on the input area, the detected force, and the touch position.

Accordingly, the operation can be performed based on the three parameters representing the input area, the detected force, and the touch position, and thereby a wider variety of operations can be performed.

The force detection unit may be a movement sensor which detects a movement of the information processing apparatus and the information processing unit may perform the predetermined information processing in accordance with the input area and the detected movement.

Accordingly, a movement such as a vibration and the like of the information processing apparatus generated at a time of a touch input can be detected, and thus a force of the touch input can be indirectly detected without detecting a pressure of the touch input.

The information processing unit may perform the predetermined information processing in accordance with the input area, a magnitude and a direction of the movement detected by the movement sensor.

Accordingly, various different operations can be performed in accordance with the magnitude and the direction of the detected movement.

The force detection unit may be a pressure sensor which detects a pressure applied to the touch input unit and the detected force may be a magnitude of the pressure detected by the pressure sensor.

Accordingly, the pressure at the time of the touch input can be detected and thus the force of the touch input can be directly detected.

The information processing unit may perform the predetermined information processing when the input area and the detected force exceed a predetermined size and a predetermined magnitude, respectively.

Accordingly, information processing which corresponds to an input value can be easily selected.

The information processing unit may perform the predetermined information processing when the touch position is in a certain region.

Accordingly, a wider variety of operations based on the touch position can be performed.

The evaluation unit may evaluate the input area based on a number of touches performed on the touch input unit.

Accordingly, a wider variety of operations based on the number of touches can be performed.

The information processing apparatus may include a storage unit and the storage unit may store a table of setting values defining information processes which correspond to the respective setting values. The information processing unit may search the table of setting values for at least one of a setting value which corresponds to the input area and a setting value which corresponds to a force detection value representing the detected force and perform information processing which corresponds to the corresponding setting value.

Accordingly, options of information processing can be easily increased without deteriorating usability for the user.

The program may cause the computer of the information processing apparatus to further function as a display control unit which reads information from a storage unit and displays the information on a display. The information processing performed by the information processing unit may be a process with regard to transformation of an object displayed on the display, and at least one of a transformation range and a degree of transformation of the object may be changed based on at least one of the input area and the detected force.

Accordingly, a variety of transformation operations by the touch input can be performed with respect to the object.

The information processing unit may further exert a predetermined shape change on the transformation of the object based on at least one of the input area and the detected force.

Accordingly, the transformation operations by the touch input accompanied by a variety of shape changes can be performed with respect to the object.

The information processing performed by the information processing unit may be a process with regard to an in-game effect and at least one of a target range and a magnitude of the in-game effect may be changed based on at least one of the input area and the detected force.

Accordingly, a variety of operations by the touch input can be performed with respect to the in-game effect.

The program may cause the computer of the information processing apparatus to further function as a display control unit which reads information from a storage unit and displays the information on a display. The information processing performed by the information processing unit may be a process with regard to image display of the display and at least one of a number of display images to transit and a transition speed may be changed based on at least one of the input area and the detected force.

Accordingly, a variety of operations by the touch input can be performed with respect to the display images.

The information processing performed by the information processing unit may be a process with regard to data reproduction, and at least one of a skip time and a speed of the data reproduction may be changed based on at least one of the input area and the detected force.

Accordingly, a variety of operations by the touch input can be performed with respect to the data reproduction.

According to the present technology, a user interface which allows a variety of operations can be provided.

DETAILED DESCRIPTION OF NON-LIMITING EXAMPLE EMBODIMENTS

First Exemplary Embodiment (Structure of Information Processing Apparatus)

Figure 1:
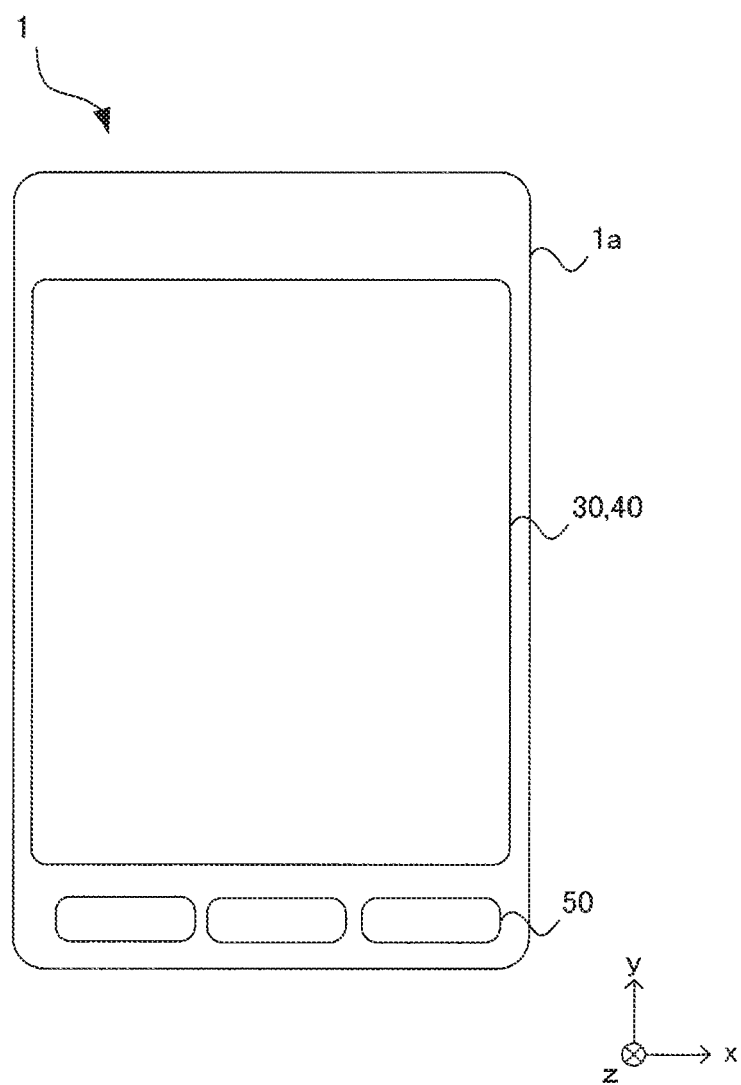
FIG. 1 is a non-limiting example external view of an information processing apparatus.

FIG. 1 is an external view of an information processing apparatus according to an exemplary embodiment of the present technology.

As shown in FIG. 1, an information processing apparatus 1 is a hand-held information processing apparatus and includes a housing 1a, a display 30, a touch panel 40, and an operation unit 50.

The housing 1a is of a size that can be held by one hand of a user. The housing 1a is provided with the display 30 and a front surface of the display 30 is covered with the touch panel 40. The housing 1a is further provided with the operation unit 50. Details of the display 30, the touch panel 40, and the operation unit 50 will be described below. The touch panel 40 may be provided at any suitable location other than the front surface of the display 30.

(Internal Configuration of Information Processing Apparatus)

Figure 2:
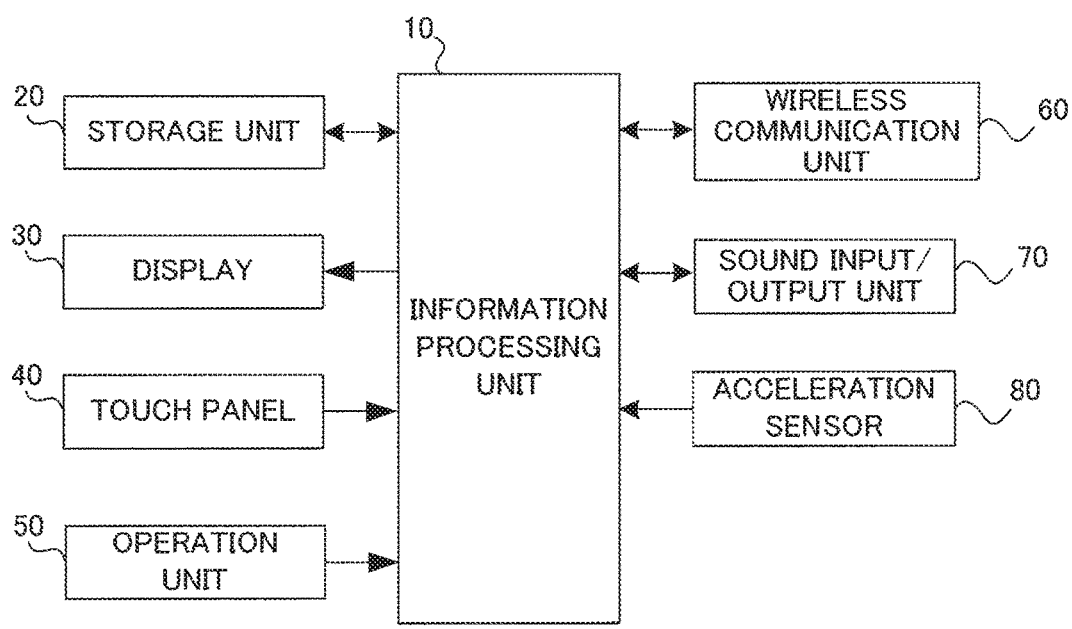
FIG. 2 is a non-limiting example block diagram illustrating an internal configuration of the information processing apparatus.

FIG. 2 is a block diagram illustrating an internal configuration of the information processing apparatus according to the exemplary embodiment of the present technology.

As shown in FIG. 2, the information processing apparatus 1 includes an information processing unit 10, a storage unit 20, the display 30, the touch panel 40, the operation unit 50, a wireless communication unit 60, a sound input/output unit 70, and an acceleration sensor 80.

The information processing unit 10 reads an information processing program stored in the storage unit 20 and executes the information processing program, thereby performing information processing described below. The information processing unit 10 includes a CPU (Central Processing Unit), for example.

The storage unit 20 stores the information processing program executed by the information processing unit 10, image data to be displayed on the display 30, sound data to be outputted from the sound input/output unit 70, information from the touch panel 40, the operation unit 50, the wireless communication unit 60, the sound input/output unit 70, and the acceleration sensor 80, and the like. The storage unit 20 includes a RAM (Random Access Memory) or a ROM (Read Only Memory), for example.

The display 30 displays an image generated by the information processing unit 10 executing the information processing program and an image downloaded from a web site on the internet via the wireless communication unit 60. The display 30 includes an LCD (Liquid Crystal Display), for example.

The user of the information processing apparatus 1 brings his/her finger, a pen, and the like into contact with the touch panel 40, thereby the touch panel 40 is caused to obtain information of a contact position and a contact area at regular time intervals and output the information to the information processing unit 10. The touch panel 40 includes an electrostatic capacitance type touch panel, for example. The touch panel 40 can simultaneously detect positions of a plurality of points positioned on the touch panel 40 at regular intervals. When the finger of the user is brought into contact with the touch panel 40, usually a contact region of a finger is wider enough than the regular interval. Thus, the touch panel 40 simultaneously detects a plurality of positions, and outputs the plurality of positions to the information processing unit 10. Because the touch panel 40 covers the display 30, positions on the touch panel 40 detected by the touch panel 40 are referred to as positions on a screen of the display 30 for ease of explanation. The information processing unit 10 stores the detected positions temporarily in the storage unit 20.

As shown in FIG. 1, the touch panel 40 has a rectangle shape, and a direction parallel to one side of the rectangle is defined as an X-axial direction while a direction parallel to a side adjoining the one side is defined as a Y-axial direction. A contact position is defined by an X coordinate and a Y coordinate, for example. The X coordinate is obtained by specifying a position having a maximum X value and a position having a minimum X value among positions forming the contact region and obtaining a center position between these positions. The Y coordinate is obtained by specifying a position having a maximum Y value and a position having a minimum Y value among the positions forming the contact region and obtaining a center position of these positions.

A contact area is obtained by, for example: specifying the position having the maximum X value and the position having the minimum X value among positions forming the contact region and defining a difference between the X values as a length of a short axis (or long axis); specifying the position having the maximum Y value and the position having the minimum Y value among the positions forming the contact region and defining a difference between the Y values as a length of a long axis (or short axis); and obtaining an area of an ellipse using these lengths. As another example, the contact area may be evaluated based on a number of touches (e.g., a number of fingers, touch pens, and the like which touch the touch panel 40) performed on the touch panel 40. For example, the contact area is determined to be small in later-described FIG. 3 because a single finger is in contact with the touch panel 40, while the contact area is determined to be large in later-described FIG. 4 because two fingers are in contact with the touch panel 40.

The operation unit 50 obtains operation information in accordance with an operation performed by the user and outputs the operation information to the information processing unit 10. The operation unit 50 includes operation buttons which can be pressed down by the user, for example.

The wireless communication unit 60 transmits information from the information processing unit 10 to a server on the internet and another information processing apparatus and transmits information from the server on the internet and the other information processing apparatus to the information processing unit 10. The wireless communication unit 60 includes a module having a function of connecting to a wireless LAN by using a method based on, for example, IEEE802.11.b/g.

The sound input/output unit 70 outputs a sound represented by the sound data read by the information processing unit 10 from the storage unit 20 and outputs sound data representing a sound inputted from the outside of the information processing apparatus 1 to the information processing unit 10. The sound input/output unit 70 includes a microphone and a speaker, for example. The acceleration sensor 80 detects accelerations in three-axial directions (X-axis, Y-axis, and Z-axial directions) shown in FIG. 1 and outputs acceleration values representing the detected accelerations to the information processing unit 10.

(Outline of Display Process According to First Exemplary Embodiment)

In the following, an outline of a display process of a cubical object displayed on the display 30 of the information processing apparatus 1 will be described. The cubical object is displayed on the display 30 and transformed based on a contact area obtained when the user's finger contacts the touch panel 40 and a force applied to the information processing apparatus 1 by the contact. The cubical object will be described below. The display process according to the exemplary embodiment is applicable also to an object such as a plane object other than the cubical object.

Figure 3:
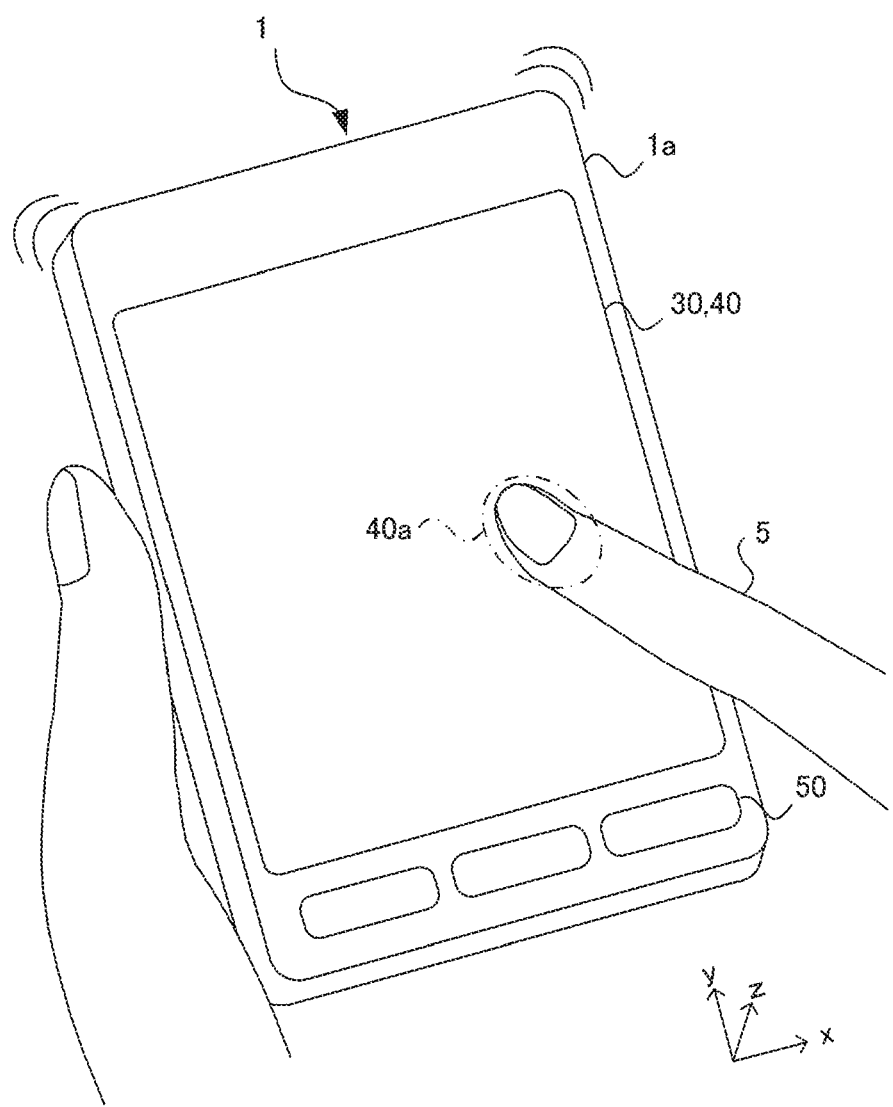
FIG. 3 is a non-limiting example diagram illustrating an operation of the information processing apparatus with a single finger.
Figure 4:
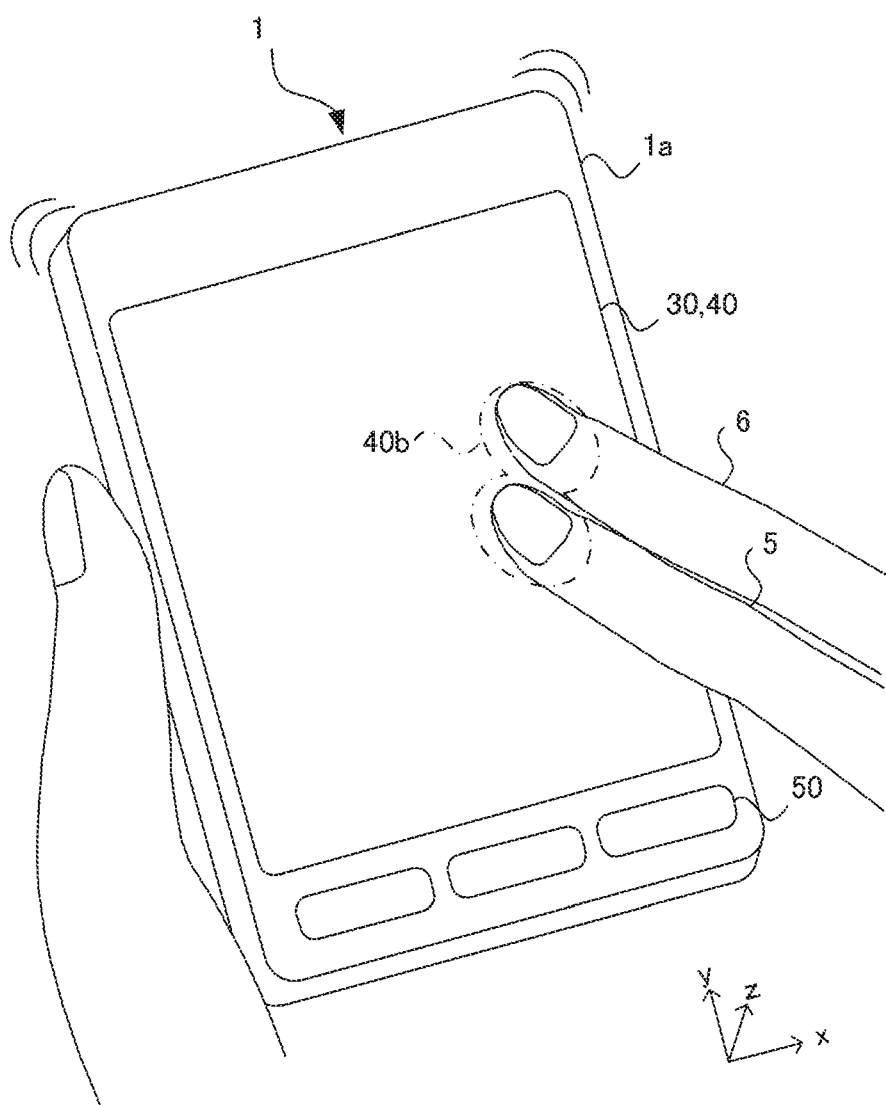
FIG. 4 is a non-limiting example diagram illustrating an operation of the information processing apparatus with two fingers.

FIG. 3 is a diagram illustrating an operation of the information processing apparatus with a single finger. FIG. 4 is a diagram illustrating an operation of the information processing apparatus with two fingers.

As shown in FIG. 3 and FIG. 4, there are a case in which a touch input is performed by bringing a single finger 5 into contact with the touch panel 40 and a case in which a touch input is performed by bringing two fingers 5, 6 into contact with the touch panel 40. The touch input with the single finger and the touch input with the two fingers are different from each other in that contact areas of respective contact regions 40a, 40b on the touch panel 40 are different. That is, the contact region 40a in FIG. 3 is a contact area corresponding to a tip of a single finger and the contact region 40b in FIG. 4 is a contact area corresponding to tips of two fingers which are twice the contact area corresponding to the tip of the single finger. Accordingly, the number of fingers used for the touch input can be detected based on the contact area. It should be noted that, other than the number of fingers, which of a fingertip, a finger pad, a touch pen (stylus), and the like is used to perform a touch input on the touch panel 40 can be identified based on the contact area.

Further, the information processing apparatus 1 includes the acceleration sensor 80 in the housing 1a and detects a force applied to the information processing apparatus 1 at a time of the touch input based on a magnitude of an acceleration detected by the acceleration sensor 80. When the user operates the information processing apparatus 1 by a touch input, the user performs the touch input by pressing his/her finger against the touch panel 40. However, because the user operates the information processing apparatus 1 while holding the housing 1a with his/her hands, the housing 1a slightly shakes when the finger is pressed against the touch panel 40. When the user presses his/her finger against the touch panel 40 with an increased force, the housing 1a shakes more greatly. That is, the acceleration sensor 80 is a movement detection sensor which detects a movement of the information processing apparatus 1 (housing 1a), and the detected movement can be regarded as the force applied to the information processing apparatus 1 at the time of the touch input. The detected movement can also be regarded as a vibration applied to the information processing apparatus 1 at the time of the touch input. The acceleration sensor may be various types of acceleration sensors, such as, for example, an acceleration sensor which outputs an electric signal proportional to a detected acceleration, an acceleration sensor which outputs a detected acceleration as a mathematical value, and the like. Further, the acceleration sensor may be a contact type mechanical acceleration sensor which outputs a detection signal as a switch is turned on when an applied force (acceleration) exceeds a predetermined magnitude.

As the movement detection sensor, a sensor such as a gyro sensor which detects an angular velocity and a magnetic sensor which detects a direction can be used. In addition, a function equivalent to that of the movement detection sensor can be realized by analyzing images which are sequentially captured by a camera and detecting differences among the images. Further, a pressure sensor may be provided in the touch panel 40 so that a pressure applied to the touch panel 40 by the touch input can be directly detected and the detected pressure may be regarded as the force applied to the information processing apparatus 1 at the time of the touch input. Accordingly, with a single operation of performing the touch input to the touch panel 40, the user can obtain two types of parameters representing the contact area and the force applied to the information processing apparatus 1.

Next, an exemplary process of transforming a cubical object displayed on the display 30 based on a contact area obtained at a time of a touch input and a force (or a vibration applied to the information processing apparatus 1) to the information processing apparatus 1 will be described.

Figure 5:
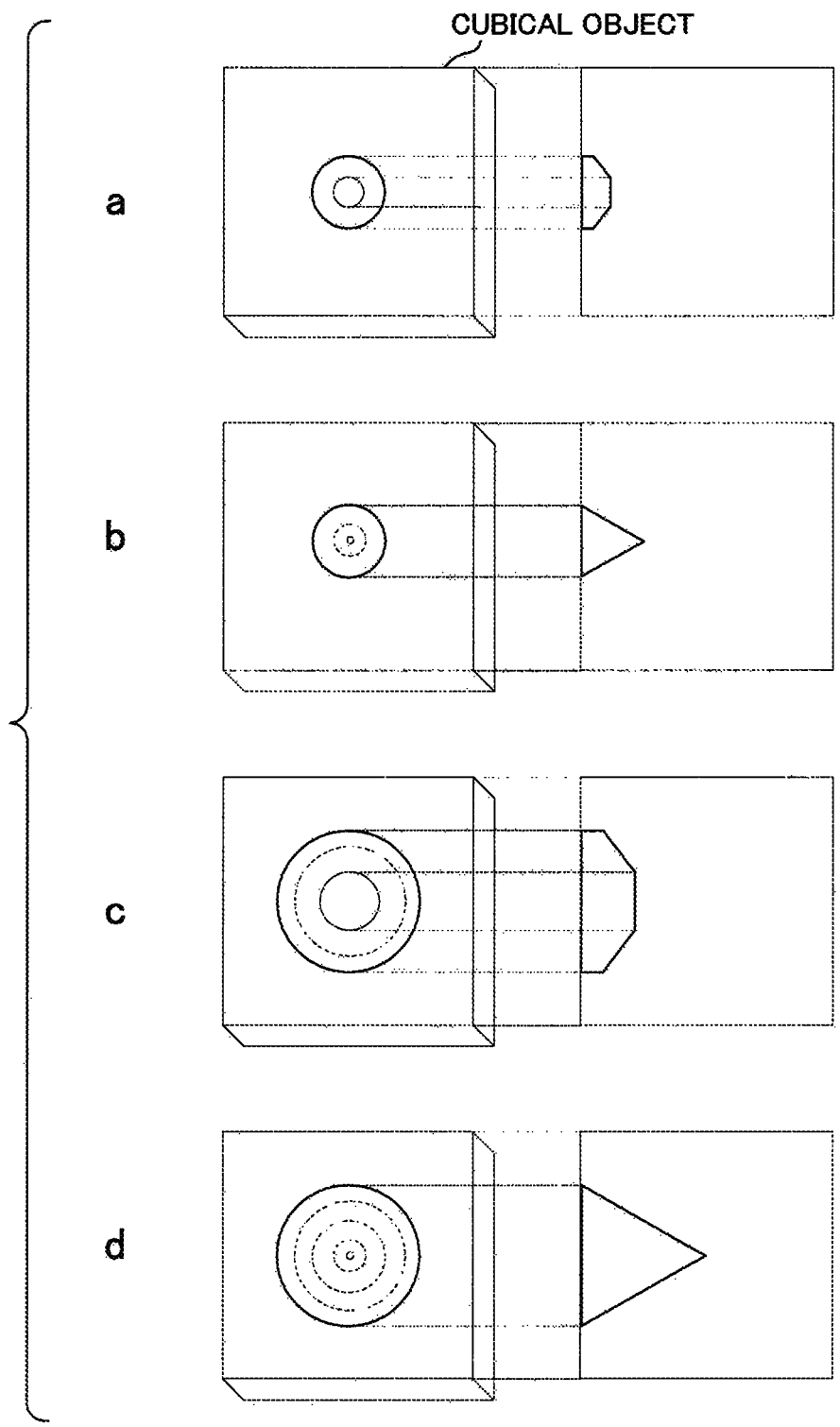
FIG. 5 is a non-limiting example diagram illustrating a transformation pattern of a cubical object.

FIG. 5 is a diagram illustrating a transformation pattern of a cubical object displayed on the display.

In the exemplary embodiment, two types of ranges (hereinafter referred to as transformation ranges) of performing a transformation effect on the cubical object based on whether the contact area is greater than or equal to a predetermined first threshold value are set. In addition, two types of depth/height (hereinafter referred to as degrees of transformation) of the transformation effect performed on the cubical object based on whether the magnitude of the acceleration is greater than or equal to a predetermined second threshold value are set. That is, there are two levels of transformation ranges and two degrees of transformation and thus there are typical four transformation modes of the cubical object.

In the exemplary embodiment, a coordinate system in a real space is associated with a coordinate system in a virtual space, thereby a more intuitive operation is realized. Specifically, a parameter representing an expanse on an X-Y plane in FIG. 3 and FIG. 4 which is a coordinate plane of the contact area is used as a transformation range. That is, the cubical object is transformed within a range corresponding to an area on the touch panel 40 which is actually contacted by the user's finger. Meanwhile, a parameter representing a depth/height with respect to a Z-axial direction which is a pressing direction of a touch operation in FIG. 3 and FIG. 4 is used as a degree of transformation. That is, the user can perform a transformation on the cubical object with an operational feeling as if the user actually presses the cubical object with his/her finger. Needless to say, the parameter may represent an expanse on another plane and a depth in another axial direction.

As shown in FIG. 5, a transformation mode a illustrates a transformation when a weak touch input is performed with the single finger 5 as shown in FIG. 3, that is, when the contact area is less than the first threshold value and the magnitude of the acceleration is less than the second threshold value. In the transformation a, the cubical object has a shallow concave portion thereon in a narrow range. This transformation is accompanied by a transformed shape change associated with an image of the cubical object being hit by an object having a small apical surface with a weak force.

Similarly to the transformation mode a, a transformation mode b illustrates a case of a touch input with the single finger 5. However, the transformation b illustrates a transformation when a strong touch input is performed, that is, when the contact area is less than the first threshold value and the magnitude of the acceleration is greater than or equal to the second threshold value. In the transformation b, the cubical object has a deep and sharp concave portion thereon in a narrow range. This transformation is accompanied by a transformed shape change associated with an image of the cubical object being hit by an object having a small apical surface with a strong force.

A transformation mode c illustrates a transformation when a weak touch input is performed with the two fingers 5, 6 as shown in FIG. 4, that is, when the contact area is greater than or equal to the first threshold value and the magnitude of the acceleration is less than the second threshold value. In the transformation c, the cubical object has a shallow concave portion thereon in a wide range. This transformation is accompanied by a transformed shape change associated with an image of the cubical object being hit by an object having a large apical surface with a weak force.

Similar to the transformation mode c, a transformation mode d illustrates a transformation in a case of a touch input with the two fingers 5, 6. However, the transformation mode d illustrates a transformation when a strong touch input is performed, that is, when the contact area is greater than or equal to the first threshold value and the magnitude of the acceleration is greater than or equal to the second threshold value. In the transformation mode d, the cubical object has a deep and sharp concave portion thereon in a wide range. This transformation accompanies a transformed shape change associated with an image of the cubical object being hit by an object having a large apical surface with a strong force. Needless to say, these presentation effects are not indispensable. Only the transformation range and the degree of transformation may be changed in accordance with the contact area and the magnitude of the acceleration without changing the transformed shape in the transformation range.

Accordingly, the user can obtain two types of parameters representing the contact area and the force applied to the information processing apparatus 1 by the single operation of performing the touch input to the touch panel 40 and transform the target object in various manners based on the parameters. There may be three types of parameters if a touch position (input coordinate) on the touch panel 40 is taken into account.

(Detailed Display Process According to First Exemplary Embodiment)

Figure 6:
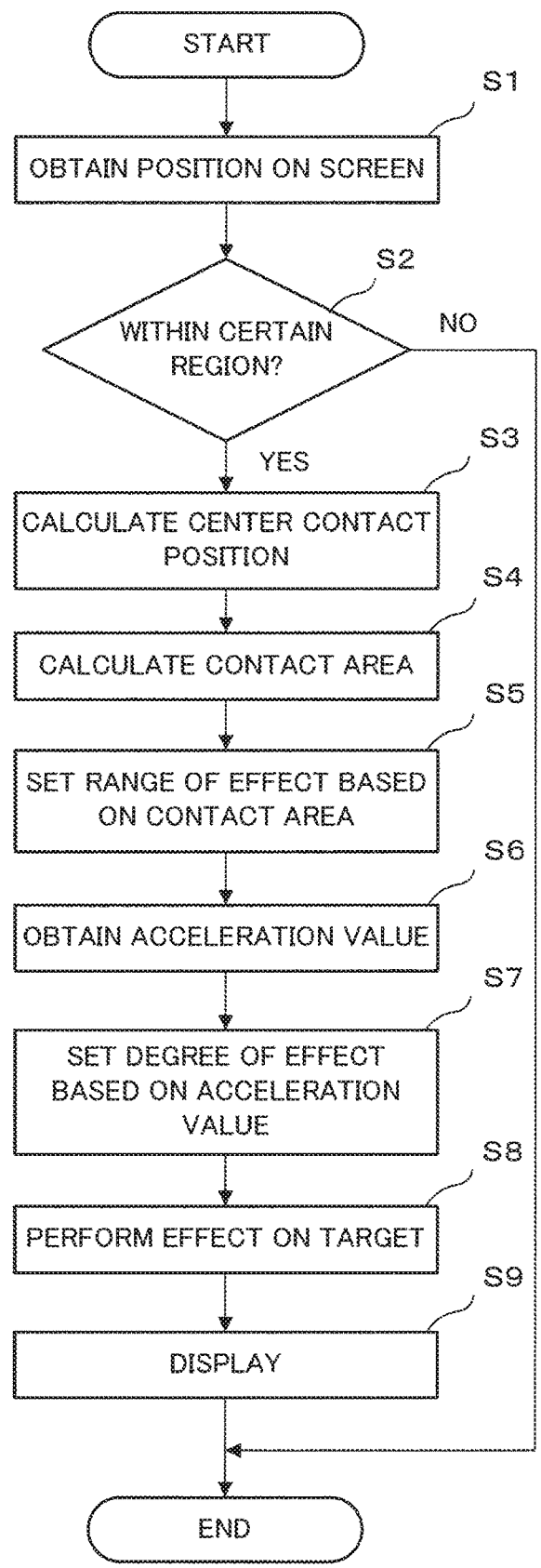
FIG. 6 is a non-limiting example flow chart illustrating details of a display process.

Next, a display process according to the first exemplary embodiment will be described in detail with reference to FIG. 6. FIG. 6 is a flow chart illustrating details of the display process according to the first exemplary embodiment. The information processing unit 10 executes the information processing program stored in the storage unit 20, thereby the process shown in the flow chart of FIG. 6 is performed.

The user holds the housing 1a of the information processing apparatus 1 with one hand and performs a touch input for transforming a cubical object on the display 30 with the finger 5 or the fingers 5, 6 of the other hand. At this time, the information processing unit 10 obtains a plurality of positions on the screen of the display 30 from the touch panel 40 (step S1), and determines whether any of the obtained plurality of positions is in a certain region set in the cubical object (step S2). When a determination result is that all of the obtained plurality of positions are not in the certain region, the information processing unit 10 ends the processing.

When the determination result is that any of the obtained plurality of positions is in the certain region, the information processing unit 10 calculates a center contact position representing the center position of a region on the touch panel 40 contacted by the finger based on the plurality of positions on the screen of the display 30 obtained from the touch panel 40 (step S3), and calculates a contact area representing an area of the region on the touch panel 40 contacted by the finger (step S4). At this time, an area of a region, in which the region on the touch panel 40 contacted by the finger and a region of a projection plane of the cubical object on the touch panel 40 overlap each other, may be calculated as the contact area.

The information processing unit 10 sets a transformation range of the cubical object based on the calculated contact area (step S5). Specifically, a first threshold value for setting the transformation range is prestored in the storage unit 20 and the information processing unit 10 reads the first threshold value from the storage unit 20. Then, the information processing unit 10 compares the calculated contact area with the first threshold value and sets the transformation range to either a large range or a small range based on a comparison result. For example, when the calculated contact area is greater than or equal to the first threshold value, the information processing unit 10 sets the transformation range to a group of the mode a or b shown in FIG. 5. Meanwhile, when the calculated contact area is less than the first threshold value, the information processing unit 10 sets the transformation range to a group of the mode c or d shown in FIG. 5.

The information processing unit 10 obtains an acceleration value from the acceleration sensor 80 (step S6), and sets a degree of transformation for the cubical object based on the obtained acceleration value (step S7). Specifically, a second threshold value for setting the degree of transformation is prestored in the storage unit 20 and the information processing unit 10 reads the second threshold value from the storage unit 20. Then, the information processing unit 10 calculates a magnitude of the acceleration based on the obtained acceleration value, compares the calculated magnitude of the acceleration with the second threshold value, and sets the degree of transformation to either a great degree or a low degree based on a comparison result. For example, when the calculated magnitude of the acceleration is less than the second threshold value, the information processing unit 10 sets the degree of transformation to the group of the mode a or c shown in FIG. 5. Meanwhile, when the calculated magnitude of the acceleration is greater than or equal to the second threshold value, the information processing unit 10 sets the degree of transformation to the group of the mode b or d shown in FIG. 5.

Based on the set transformation range and the degree of transformation, the information processing unit 10 performs a well-known polygon transformation process for exerting a transformation effect on the cubical object with the calculated center contact position as the center (step S8), and displays the cubical object after the transformation process on the display 30 (step S9).

As described above, in the exemplary embodiment, the cubical object can be transformed in various manners based on the contact area obtained by the touch input and the force applied to the information processing apparatus 1 at the time of the touch input. Variations of transformation of the object by the touch input can be increased.

In the exemplary embodiment, the contact area and the magnitude of the acceleration on the touch panel 40 are evaluated by comparing the contact area and the magnitude of the acceleration with the respective predetermined threshold values and determined to be either large or small using two values. However, a transformation may be performed successively based on the contact area and the magnitude of the acceleration as they are. In this case, a table defining setting values corresponding to ranges of the contact area and the magnitude of the acceleration is stored in the storage unit 20. A setting value which corresponds to a range in which the calculated contact area or the magnitude of the acceleration falls may be set as the transformation range or the degree of transformation. Each setting value allows a predetermined range of values for the corresponding contact area or the corresponding magnitude of the acceleration. Accordingly, differences which are fluctuation components of the contact area and the magnitude of the acceleration which occur among each of touch inputs are absorbed, and thereby consistent usability can be provided to the user. The same is true to detection values of the contact area and the acceleration. Therefore, by performing a moving averaging process on the detection values, fluctuation components of the detection values generated from a slight movement of a finger and a slight movement of a hand holding the housing 1a each time a touch input is performed can be absorbed.

In the exemplary embodiment, in step S7, setting is performed based only on the magnitude of the acceleration generated at the time of the touch input without considering an axial direction of the acceleration. A great acceleration is considered to be generated in the Z-axial direction in FIG. 3 and FIG. 4 at the time of the touch input. Therefore, among components of the acceleration detected by the acceleration sensor 80, only a component of the Z-axial direction which is a direction orthogonal to a touch surface of the touch panel 40 may be used. Needless to say, a magnitude of the force applied to the housing 1a may be evaluated by taking all of the components including X-axis and Y-axis components. Further, because the acceleration sensor 80 constantly outputs detection values which include a gravity acceleration component, the degree of transformation may be set based on a degree of change in the acceleration obtained by performing a first derivation on the detection values and removing the gravity acceleration component.

In the exemplary embodiment, the cubical object is transformed. However, an in-game effect may be performed on an object in a game. For example, when a contact area is small and a force applied to the information processing apparatus 1 is large, an in-game effect as if hitting with a fist is performed. When the contact area is small and the force applied to the information processing apparatus 1 is small, an in-game effect as if poking with a fingertip is performed. When the contact area is large and the force applied to the information processing apparatus 1 is large, an in-game effect as if slapping with a palm is performed. When the contact area is large and the force applied to the information processing apparatus 1 is small, an in-game effect as if stroking with a palm may be performed. Further, for example, these effects can also be applied to an attack effect in a role-playing game, an action game, and the like. In this case, a selection range of a target to perform an effect, that is, an attack target is set in accordance with a contact area, and a magnitude of the attack effect is set in accordance with a force applied to the information processing apparatus 1. Specifically, for example, when the contact area is small and the force applied to the information processing apparatus 1 is large, a strong attack is performed on a single enemy.

When the contact area is small and the force applied to the information processing apparatus 1 is small, a weak attack is performed on the single enemy. When the contact area is large and the force applied to the information processing apparatus 1 is large, a strong attack is performed on all of or a plurality of enemies. When the contact area is large and the force applied to the information processing apparatus 1 is small, a weak attack is performed on all of or a plurality of the enemies. Further, an in-game effect and a target of the in-game effect may be selected in accordance with a touch position. For example, when a part of the touch panel 40 on which an enemy is displayed is touched, an attack magic may be performed on the enemy. Meanwhile, when a part of the touch panel 40 on which a friend is displayed is touched, a recovering magic or a defense magic may be performed on the friend.

In the exemplary embodiment, the range and the magnitude of the in-game effect are set separately in accordance with the contact area and the acceleration value, respectively. In another exemplary embodiment, information processing with regard to an output may be performed based on both of an input area of a touch input and a force detected by a force detection unit. For example, in a game aimed at hitting a ball further in a virtual space, an input area to the touch panel 40 is converted into a first parameter value, an acceleration detected by the force detection unit is converted into a second parameter value, and the first parameter value and the second parameter value are added. The greater a value obtained by adding the parameter values is, the further the ball may be hit.

In the exemplary embodiment, a transformation effect is exerted on an object in an application such as a game. However, the transformation effect is applicable also to an operation input in an application for image viewing, moving image playback, and the like. In the following, the operation input in the application for image viewing, moving image playback and the like will be described in detail. In the application for image viewing, moving image playback, and the like, an image, a moving image, and the like stored in the storage unit 20 are read and displayed on the display 30. The image, the moving image, and the like are operated based on a contact area and a force applied to the information processing apparatus 1 obtained by a touch input. Details of a display process according to this modification is generally the same as the display process of the flow chart shown in FIG. 6, and thus description thereof will be made with reference to FIGS. 3, 4, and 6 in the same manner.

The user holds the housing 1a of the information processing apparatus 1 with one hand and performs a touch input for performing an operation on an image and the like on the display 30 with the finger 5 or the fingers 5, 6 of the other hand. At this time, the information processing unit 10 obtains a plurality of positions on the screen of the display 30 from the touch panel 40 (step S1), and determines whether any of the obtained plurality of positions is in a certain region set in an operation button of the application (step S2). When a determination result is that all of the obtained plurality of positions are not in the certain region, the information processing unit 10 ends the processing.

When the determination result is that any of the obtained plurality of positions is in the certain region, the information processing unit 10 calculates a center contact position representing the center position of a region on the touch panel 40 contacted by the finger based on the plurality of positions on the screen of the display 30 obtained from the touch panel 40 (step S3), and calculates a contact area representing an area of the region on the touch panel 40 contacted by the finger (step S4).

The information processing unit 10 sets a range of an amount of operation to be performed on a target such as the image and the like based on the calculated contact area (step S5). The amount of operation corresponds to an operation content assigned to a corresponding operation button.

The information processing unit 10 obtains an acceleration value from the acceleration sensor 80 (step S6), and sets a magnitude of an effect to be exerted by an operation performed on the target such as the image and the like based on the obtained acceleration value (step S7).

The information processing unit 10 performs an operation process on the image and the like based on the thus set range of the amount of operation and the magnitude of the operation effect (step S8), and causes the display 30 to display thereon a series of operations performed on the image and the like and results of the operations (step S9).

In the above described display process, step S3 of obtaining the center contact position is not particularly necessary. However, when another operation button region and the like is closely provided, the information processing unit 10 may determine which operation button is pressed based on the center contact position.

As a specific operation example in the above described application, for example, in the image viewing application, a number of images to transit in a slide show which sequentially displays display images is set in accordance with a contact area and a transition speed of the display images is set in accordance with a magnitude of a force applied to the information processing apparatus 1 at a time of a touch input. Specifically, for example, when the contact area is small and the force applied to the information processing apparatus 1 is large, the number of images to transit is low and the transition speed is high. When the contact area is small and the force applied to the information processing apparatus 1 is small, the number of images to transit is low and the transition speed is low. When the contact area is large and the force applied to the information processing apparatus 1 is large, the number of images to transit is high and the transition speed is high. When the contact area is large and the force applied to the information processing apparatus 1 is small, the number of images to transit is high and the transition speed is low.

In an electronic book, a number of pages (text images) of the electronic book to be turned is set in accordance with a contact area and a page turning speed is set in accordance with a magnitude of a force applied to the information processing apparatus 1 at a time of a touch input. Specifically, for example, when the contact area is small and the force applied to the information processing apparatus 1 is large, the number of pages to be turned is low and the turning speed is high. When the contact area is small and the force applied to the information processing apparatus 1 is small, the number of pages to be turned is low and the turning speed is low. When the contact area is large and the force applied to the information processing apparatus 1 is large, the number of pages to be turned is high and the turning speed is high. When the contact area is large and the force applied to the information processing apparatus 1 is small, the number of pages to be turned is high and the turning speed is low.

In a video playback software and a music playback software, a skip time (number of frames) of moving image and music data to be reproduced is set in accordance with a contact area, and a reproduction speed of the moving image and music data is set in accordance with a magnitude of a force applied to the information processing apparatus 1 at a time of a touch input. Specifically, for example, when the contact area is small and the force applied to the information processing apparatus 1 is large, the skip time is reduced and playback is skipped for a period of time equivalent to the reduced time. When the contact area is small and the force applied to the information processing apparatus 1 is small, the skip time is reduced and fast-forward is performed. When the contact area is large and the force applied to the information processing apparatus 1 is large, the skip time is increased and playback is skipped for a period of time equivalent to the increased time. When the contact area is large and the force applied to the information processing apparatus 1 is small, the skip time is increased and the fast-forward is performed.

Further, a specific operation may be performed when both of the contact area and the force applied to the information processing apparatus 1 satisfy respective predetermined conditions. For example, in the case of the electronic book, when a zoom-in (enlarged display) is performed by a so-called tap operation and both of a detection value of the contact area and a detection value of the force at a time of the tap operation are greater than or equal to respective predetermined threshold values, a zoom out (reduced display) which is an operation opposite to a normal tap operation is performed. This is applicable also to a slide operation and a flick operation other than the tap operation. Both of the contact area and the force applied to the information processing apparatus 1 are thus used as input conditions of the touch operation, thereby variations of the touch operation can be increased. In addition, an operation content can be changed in accordance with whether a touch position is in a certain region. For example, the fast-forward may be performed when the user touches the right side of the touch panel 40 and a fast-rewind may be performed when the user touches the left side of the touch panel 40.

Further, the operation content may be changed based on a direction of an acceleration detected by the acceleration sensor 80. For example, the operation content may be changed to a display in reverse order, the fast-rewind, and the like, as appropriate, in accordance with respective applications based on an acceleration direction (−Z direction) in a depth direction generated at a time of a normal touch input and an acceleration direction (+Z direction) in a forward direction generated at a time of moving the housing 1a to bring the touch panel 40 into contact with a finger. In order to detect the acceleration direction in the +Z direction, acceleration values detected before a touch is detected are sequentially stored, a moving averaging process is performed on an acceleration value and an acceleration direction immediately prior to the touch detection, and resultant values may be used.

In an operation of an application having a special function as described above, operation parameters for changing an operation content may be associated with a contact area and a magnitude of an acceleration in advance and set as unique values for the application. However, when performing the above described operation in a software such as an OS (operation software) of the information processing apparatus 1 which provides basic functions of the information processing apparatus 1, a table of operations or a database for associating the contact area and the magnitude of the acceleration with the operation parameters may be stored in the storage unit 20 for each software to be executed or for common use. Then, a predetermined operation command may be executed by using a variable of the operation command corresponding to the contact area and the magnitude of the acceleration detected at a time of a touch input.

Second Exemplary Embodiment

Next, a second exemplary embodiment will be described. A structure and an internal configuration of an information processing apparatus according to the second exemplary embodiment are the same as those of the first exemplary embodiment, and thus description thereof will be omitted.

Conventionally, a button selection operation and the like is identified by detecting a center position of a range on an operation screen contacted by a user's finger, a pen, or the like and determining on which button or selection region the center position is. However, in recent years, information terminals have become smaller and many buttons and selection regions are provided on a small display screen in many cases. In such a case, if an operation content is identified based only on the center position of the contact range, an erroneous pressing may occur because of a slight displacement, which results in impeding a secure operation. In the exemplary embodiment, a user operation is recognized based on a size of a contact area and the like in addition to the center position of the contact range, thereby eliminating the above problem.

Figure 7:
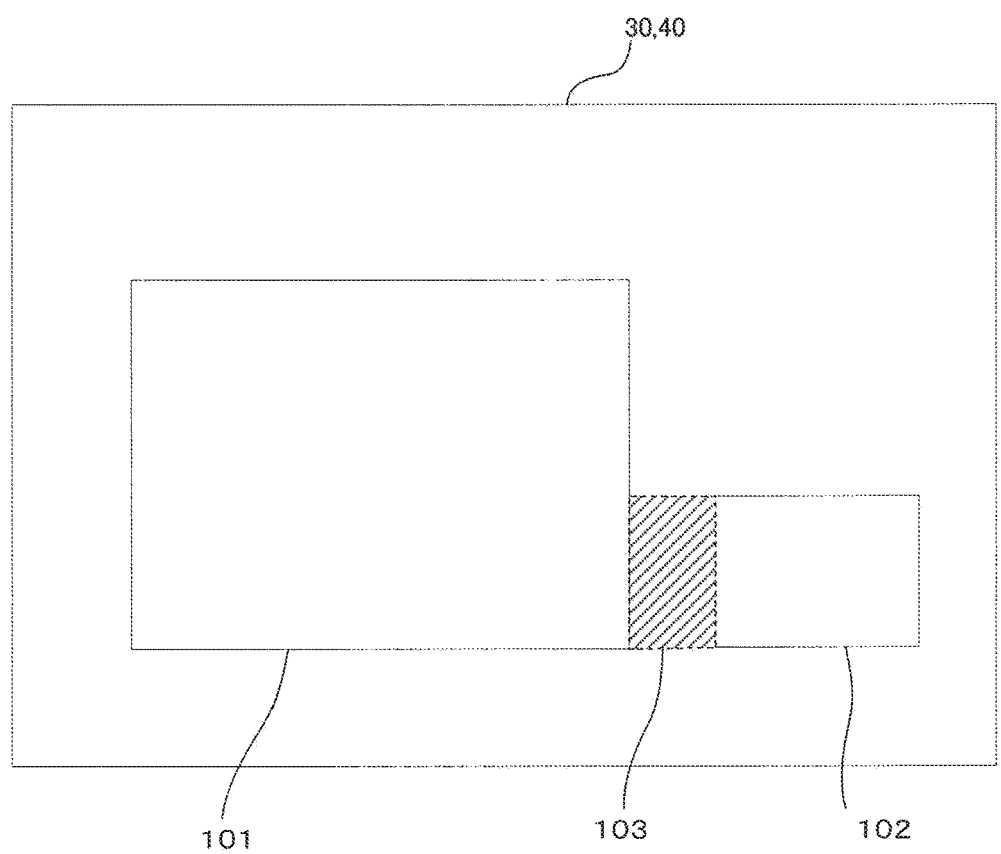
FIG. 7 is a non-limiting example diagram illustrating a display content of different sized objects.
Figure 8:
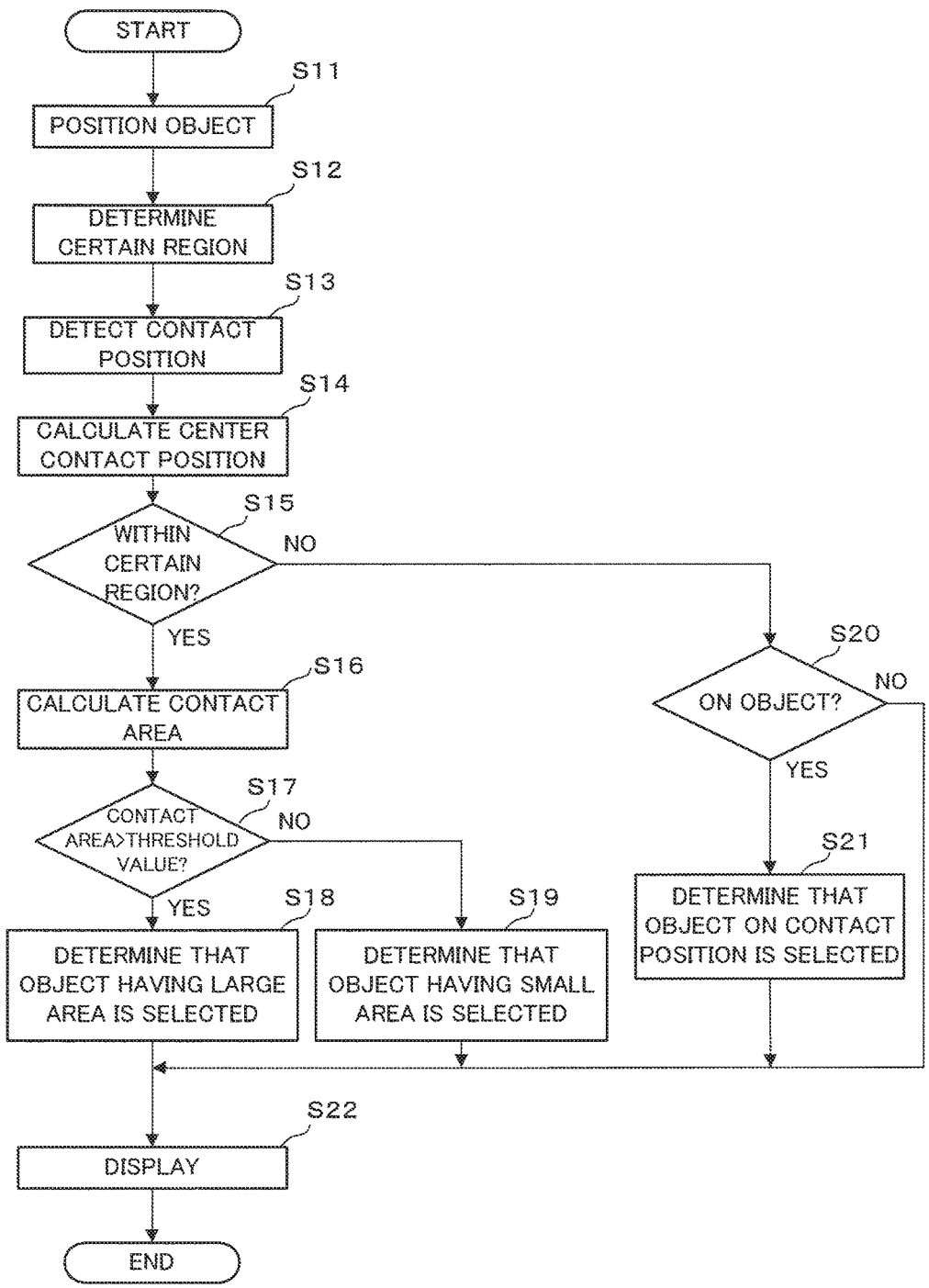
FIG. 8 is a non-limiting example flow chart illustrating details of a selection process of the different sized objects.

In the following, while taking as an example a case where an application software such as a game and the like is executed on the information processing apparatus 1 according to the exemplary embodiment, a specific use and a process flow of the information processing apparatus 1 will be described with reference to FIG. 7 and FIG. 8. FIG. 7 shows, in a case where the user selects any of a plurality of objects displayed on the display screen 30 by a touch operation, an enlarged display of two of the displayed plurality of objects (an outer frame in FIG. 7 represents a range of a part of the display screen 30). Here, an object 101 is displayed so as to be larger than an object 102. When the user touches a region (region 101) in which the object 101 is displayed, the information processing unit 10 determines that the object 101 is selected. Meanwhile, when the user touches a region (region 102) in which the object 102 is displayed, the information processing unit 10 determines that the object 102 is selected.

As shown in FIG. 7, when the plurality of objects 101, 102 which are selection targets are close to each other on the display screen, it is assumed that there may be a case where even though the user desires to select the object 101 or the object 102, a center position of a range contacted by the user is in a region (region 103) between the objects and shifted slightly from each of the regions 101, 102. In this case, which object is selected is determined in accordance with a size of an area contacted by the user. Specifically, when the contact area is large, the information processing unit 10 determines that the object 101 which is displayed so as to be larger is selected. Meanwhile, when the contact area is small, the information processing unit 10 determines that the object 102 which is displayed so as to be smaller is selected. The size of the contact area is determined by reading the largest one of contact areas detected during a period of time from a contact start (touch on) to a contact end (touch off), for example.

Generally, the larger an object is, the larger a determination region of the object becomes. In the exemplary embodiment, a determination region of each object is defined as being the same in position and size as a display region of the object. Accordingly, the object 101 has a determination region larger than a determination region of the object 102.

Consequently, due to the user's psychology, the contact area is likely to be large when the object 101 is selected and the contact area is likely to be small when the object 102 is selected. By thus applying the user's psychology to determination of selection, an operation which the user desires can easily be realized.

Next, a process of determining a selected object based on a contact area will be described in detail by following the process flow of FIG. 8. The user performs a touch input on the touch panel 40 using a finger or a touch pen while holding the information processing apparatus 1. The information processing unit 10 positions a plurality of objects which are selection targets in respective predetermined regions (step S11), and determines a certain region based on a positional relation of the plurality of objects (step S12). A region, between two objects, in which a region in which one object is displayed and a region in which the other object is displayed overlap each other either in a range on an X coordinate or in a range on a Y coordinate, is determined as the certain region (region 103 in FIG. 7). A size and a shape of the certain region may not be precise and the certain region may be determined based on any method other than the above method.

Next, the information processing unit 10 detects a coordinate group of a position on the touch panel 40 on which a touch is performed (step S13), calculates to obtain position coordinates which are the center of the coordinate group (step S14), and determines whether the center of the touch position is in the certain region (step S15). Then, when a determination result is that the center of the touch position is not in the certain region (NO in step S15), the information processing unit 10 determines whether the center of the touch position is in a region on an object (step S20). When a determination result is that the center of the touch position is in the region on the object (YES in step S20), the information processing unit 10 determines that the object is selected (step S21) and performs a display based on the selection on the display 30 (step S22). Meanwhile, when the determination result is that the center of the touch position is not in the region on the object (NO in step S20), the information processing unit 10 determines that a selection operation is not performed and performs a display for when no selection operation is performed on the display 30 (step S22).

When the determination result is that the center of the touch position is in the certain region (YES in step S15), the information processing unit 10 calculates an area on the touch panel 40 contacted by the user based on the coordinate group of the contact position (step S16). The information processing unit 10 determines whether the contact area is larger than a predetermined threshold value (S17). When a determination result is that the contact area is larger than the predetermined threshold value (YES in step S17), the information processing unit 10 determines that the object having a large area on the display screen is selected (step S18) and performs a display based on the selection result (step S22). When the determination result is that the contact area is not larger than the predetermined threshold value (NO in step S17), the information processing unit 10 determines that the object having a small area on the display screen is selected (step S19) and performs a display based on the selection result (step S22). The threshold value may be uniformly defined or may be defined differently for each object.

According to the exemplary embodiment, even when the user touches a region between a plurality of objects, which of the plurality of objects is selected can easily be determined.

Figure 9:
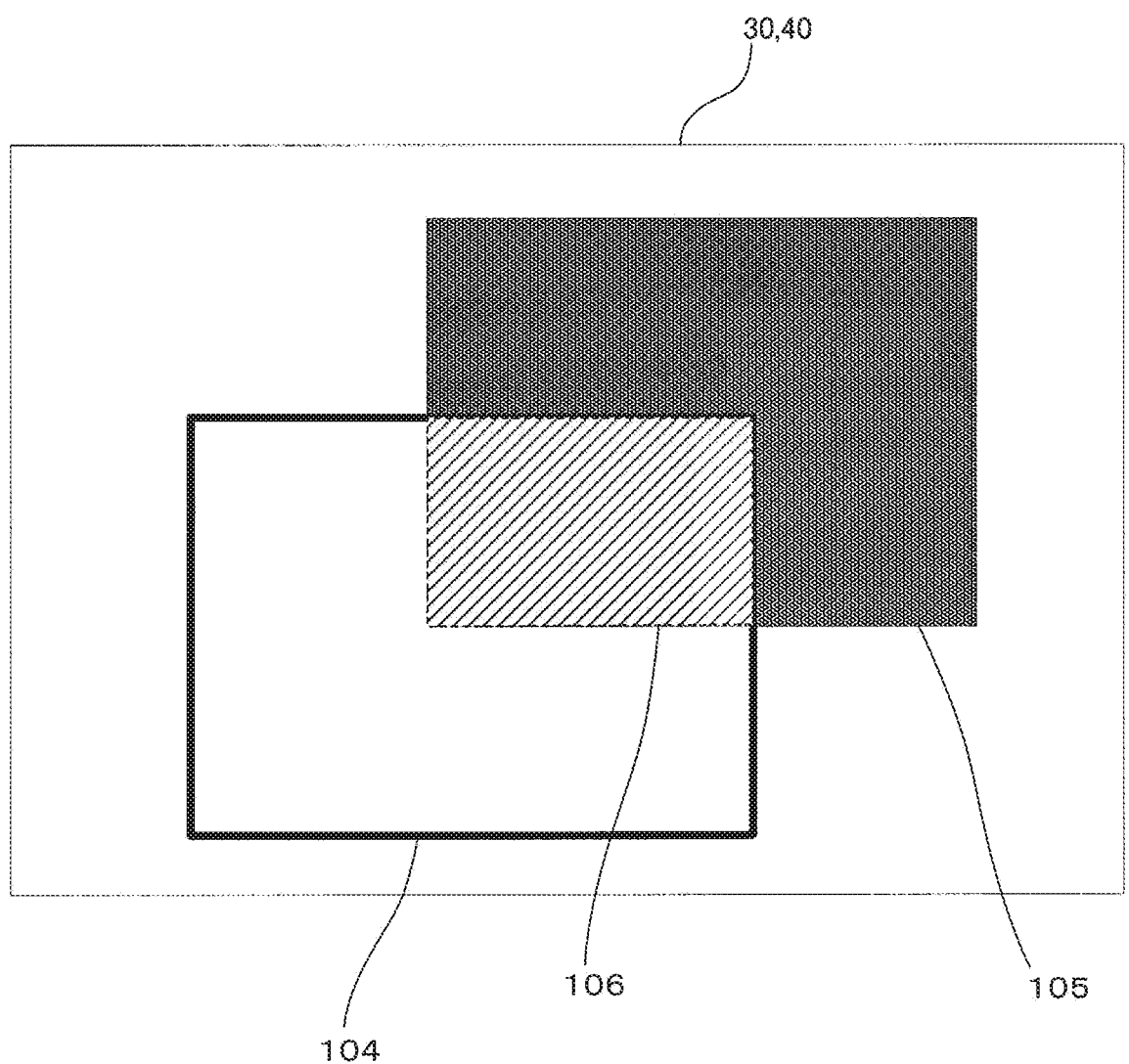
FIG. 9 is a non-limiting example diagram illustrating a display content of objects having different depth values.
Figure 10:
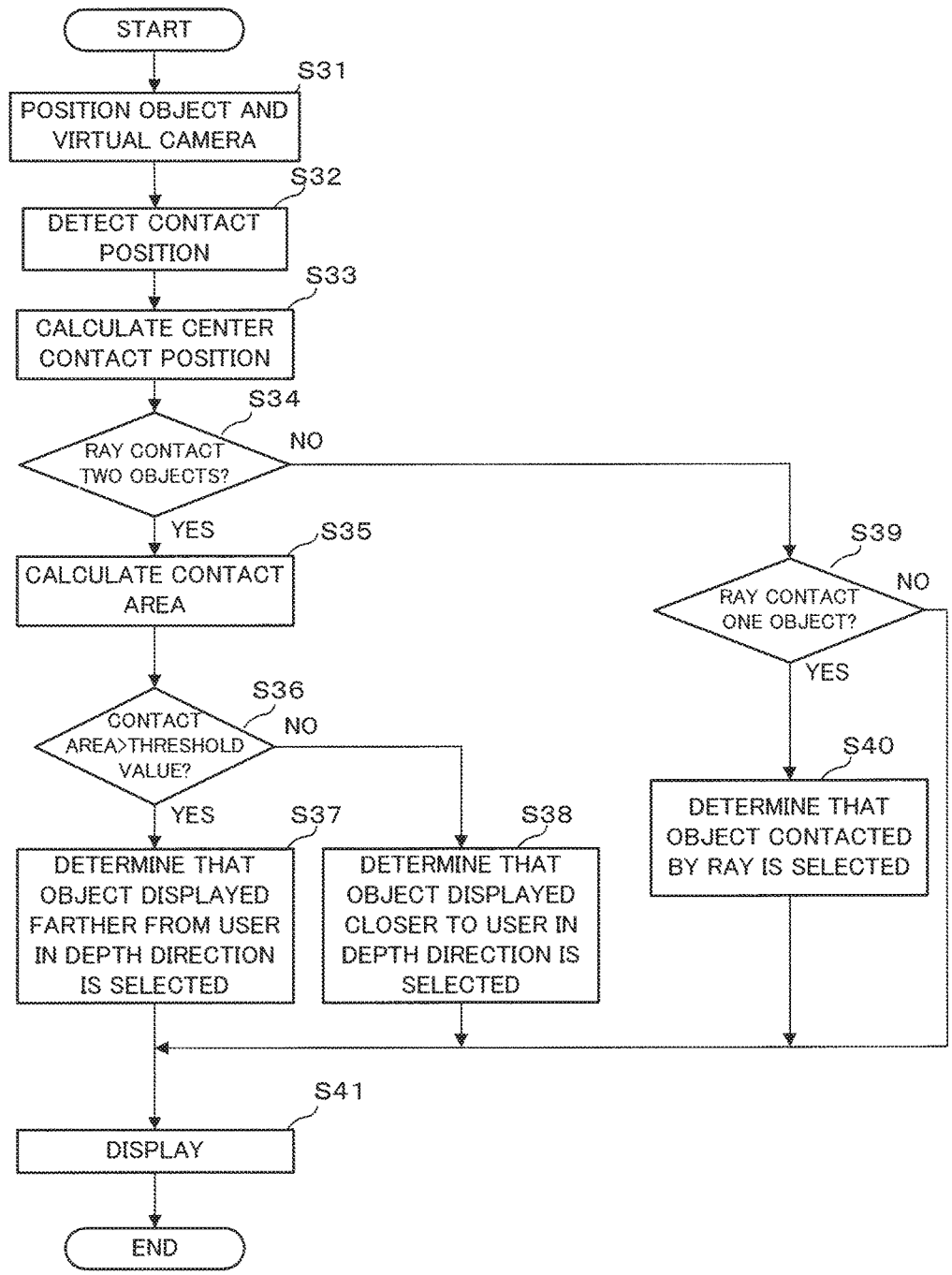
FIG. 10 is a non-limiting example flow chart illustrating details of a selection process of the objects having different depth values.

In the following, while taking as another example a case where an application software such as a game and the like is executed on the information processing apparatus 1 according to the exemplary embodiment, a specific use and a process flow of the information processing apparatus 1 will be described with reference to FIG. 9 and FIG. 10. FIG. 9 shows, in a case where the user selects any of a plurality of objects displayed on the display 30 by a touch operation, an enlarged display of two objects on the display screen. An object 104 and an object 105 are displayed so as to overlap each other in a region 106. When the user touches a region (region 104) in which the object 104 is displayed, the information processing unit 10 determines that the object 104 is selected. Meanwhile, when the user touches a region (region 105) in which the object 105 is displayed, the information processing unit 10 determines that the object 105 is selected.

As shown in FIG. 9, when the plurality of objects 104, 105 which are selection targets overlap each other on the display screen, it is assumed that there may be a case where even though the user desires to select the object 104 or the object 105, a center position of a range contacted by the user is in the region (region 106) in which the display regions of the regions 104, 105 overlap each other. In this case, the information processing unit 10 cannot determine which object the user intends to select based only on the center position of the contact range. In the exemplary embodiment, which object is selected is evaluated in accordance with a size of an area contacted by the user. Specifically, when the contact area is large, the information processing unit 10 determines that the object 105 which is displayed so as to be farther from the user in the depth direction is selected. Meanwhile, when the contact area is small, the information processing unit 10 determines that the object 104 which is displayed so as to be closer to the user in the depth direction is selected. The size of the contact area is determined by reading the largest one of contact areas detected during a period of time from a contact start (touch on) to a contact end (touch off), for example.

When the user desires to select an object which is displayed so as to be farther from the user in the depth direction, it is assumed that the user would press the touch panel 40 relatively hard. As a result, a contact area becomes large. Meanwhile, when the user desires to select an object which is displayed so as to be closer to the user in the depth direction, it is assumed that the user would contact the touch panel 40 relatively softly. As a result, a contact area becomes small. By thus applying the user's psychology to determination of selection, an operation which the user desires can easily be realized.

Next, a process of determining a selected object based on a contact area will be described in detail by following the process flow of FIG. 10. The user performs a touch input on the touch panel 40 using a finger or a touch pen while holding the information processing apparatus 1. The information processing unit 10 positions two objects which are selection targets and a virtual camera which captures the two objects in a virtual space (step S31).

Next, the information processing unit 10 detects a coordinate group of a position on the touch panel 40 on which a touch is performed (step S32) and calculates to obtain position coordinates which are the center of the coordinate group (step S33). Further, the information processing unit 10 emits a ray in the virtual space based on the center of touch position and determines whether the ray contacts a plurality of objects (step S34). When a determination result is that the ray contacts two objects (YES in step S34), the information processing unit 10 proceeds the processing to step S35. At this time, the information processing unit 10 stores an order in which the ray contacts the two objects and understands an anteroposterior relationship of the two objects. Meanwhile, when the determination result is that the ray contacts only one object or does not contact any object (NO in step S34), the information processing unit 10 proceeds the processing to step S39.

When the ray contacts only one object or does not contact any object (NO in step S34), the information processing unit 10 determines whether the ray contacts only one object (step S39). When a determination result is that the ray contacts only one object (YES in step S39), the information processing unit 10 determines that the object contacted by the ray is selected (step S40) and causes the display 30 to display thereon an image obtained by the virtual camera capturing the virtual space (step S41). Meanwhile, when the determination result is that the ray does not contact any object (NO in step S39), the information processing unit 10 proceeds the processing to step S41.

When the determination is that the ray contacts two objects (YES in step S34), the information processing unit 10 calculates an area on the touch panel 40 contacted by the user based on the coordinate group of the contact position (step S35). Next, the information processing unit 10 determines whether the contact area is larger than a predetermined threshold value (step S36). When a determination result is that the contact area is larger than the predetermined threshold value (YES in step S36), the information processing unit 10 determines that an object which is displayed so as to be farther from the user in the depth direction is selected (step S37), and proceeds the processing to step S41. Meanwhile, when the determination result is that the contact area is not larger than the predetermined threshold value (NO in step S36), the information processing unit 10 determines that an object which is displayed so as to be closer to the user in the depth direction is selected (step S38) and proceeds the processing to step S41. The threshold value may be uniformly defined or may be defined differently for each object. The anteroposterior relationship (closer to the user or further from the user) between the two objects is determined by storing the order in which the ray contacts the two objects. Further, also in a case of three or more objects, determination of selection based on a contact area can be performed.

According to the exemplary embodiment, even when the user touches a region in which a plurality of objects overlap one another, which of the plurality of objects is selected can easily be determined.

In the exemplary embodiment, when the plurality of objects overlap one another when seen from the virtual camera in the virtual space, the contact area is used for determination of selection of the objects. In another exemplary embodiment, also when a plurality of objects are displayed so as to overlap one another in a planar space (a case where a plurality of objects are positioned on the same plane and only an object having the highest display priority is displayed in a region in which the objects overlap one another, for example), similarly, contact areas may be associated with display priorities (visual anteroposterior relationship of the objects).

The display 30 in the exemplary embodiment may be a parallax barrier type or a lenticular lens type stereoscopic display screen. This enables the user to perform a more intuitive operation and the like on an object with a sense of depth which is displayed on a stereoscopic display screen.

In the exemplary embodiment, the contact area is associated with the size and the depth value of the object. In another exemplary embodiment, the contact area may be associated with anything (e.g., color, shape, up-down, left-right, and the like) with regard to the object. Accordingly, a wider variety of operations can be provided.

In the exemplary embodiment, the contact area is associated with the size and the depth value of the object. In another exemplary embodiment, the contact area may be used as depth designation information in the virtual space. For example, the contact area can be used as information, with respect to an object, for such as moving the object in the depth direction, transforming the object and designating a degree of depth. Accordingly, a wider variety of operations can be provided.

In the exemplary embodiment, the contact area is associated with the size and the depth value of the object. In another exemplary embodiment, instead of the contact area or in combination with the contact area, which finger such as a thumb, an index finger, and the like contacts the touch panel 40 may be evaluated and a determination result may be reflected on determination of selection. In this case, an instruction as to which finger is used for selecting an object may be given to the user (or from the user) each time or which finger is used may be determined based on the contact area and the contact range. Accordingly, a wider variety of operations can be provided.

In the exemplary embodiment, the contact area is associated with the size and the depth value of the object and used for determination of selection of the object. In another exemplary embodiment, the association may be used for another predetermined operation and display change instead of determination of object selection. Accordingly, a wider variety of operations can be provided.

In the exemplary embodiment, the contact area is associated with the size and the depth value of the object. In another exemplary embodiment, instead of the contact area or in combination with the contact area, determination of object selection may be based on a force detected at a time of a touch. In this case, various sensors such as an acceleration sensor, a gyro sensor, a pressure sensor, and the like can be adopted for detection of the force at the time of the touch. Accordingly, more intuitive and a wider variety of operations can be provided.

In the exemplary embodiment, the contact area is associated with the size and the depth value of the object. In another exemplary embodiment, instead of the contact area or in combination with the contact area, the determination process may be performed based on a contact time. Accordingly, a wider variety of operations can be provided.

In the exemplary embodiment, when the plurality of objects are displayed so as to overlap one another in the anteroposterior direction, the larger the contact area is, the greater the depth value of the object which is determined to be selected is. In another exemplary embodiment, when a plurality of objects are displayed so as to overlap one another in an anteroposterior direction, the greater a contact area is, the smaller a depth value of an object which is determined to be selected may be.

In the exemplary embodiment, the largest one of the contact areas detected during the time period from the contact start (touch on) to the contact end (touch off) is read. In another exemplary embodiment, an average value or an integrated value of the contact areas during the time period may be read. Alternatively, instead of reading the contact areas during the time period, a maximum value or an average value of contact areas during a time period from a predetermined time period prior to the touch off to the touch off. Accordingly, more accurate operations can be provided.

Alternatively, the contact area may be detected at predetermined regular intervals and possible selection targets may be sequentially highlighted and displayed in accordance with the contact area. In this case, when the user performs a touch off, an object which is highlighted and displayed immediately prior to the touch off is determined to be selected. Accordingly, more intuitive operations can be provided.

A mode of a touch reflects a user's mannerisms and personality and therefore the information processing unit 10 may learn each user's mannerisms when pressing the touch panel. The information processing unit 10 may learn each user's mannerisms naturally by accumulating relationship between a selection target and a touch region, or by requesting the user to touch a predetermined region in advance. Accordingly, a wider variety of operations can be provided.

Alternatively, the selection target may be evaluated based also on the contact time in addition to the size of the contact area. Specifically, when the contact time is great, an object which is displayed in a large area may be determined to be selected. Accordingly, more intuitive and a wider variety of operations can be provided.

Also in a case where there is not more than one object (when there is only a single object) which is a selection target, determination as to whether the object is selected may be made in accordance with a contact position and a size of a contact area. By using both of the contact position and the contact area for determination of selection, an erroneous operation which occurs from an erroneous contact can be prevented.

As described above, the information processing program according to the exemplary embodiment is executed by the information processing unit 10 which is a computer of the information processing apparatus 1 having the display 30 and the touch panel 40 which is a position input unit, the program causing the computer to function as:

a display control unit which displays a plurality of selection targets in a predetermined display mode on the display 30;

an evaluation unit which evaluates a contact area formed by a plurality of input positions detected by the position input unit; and a determination unit which determines which selection target is selected based at least on the contact area and a relation between one selection target and another selection target in the display mode.

Accordingly, a selection operation when there are two or more selection targets can be performed more intuitively.

Further, in the exemplary embodiment, the determination unit selects a selection target having a size corresponding to a size of the contact area from among the plurality of selection targets.

Accordingly, a selection operation on a selection target can be performed more intuitively.

Further, in the exemplary embodiment, the determination unit selects a selection target at a position corresponding to a size of the contact area from among the plurality of selection targets. In this case, the plurality of selection targets and the virtual camera may be positioned in the virtual space and a selection target at a position at a depth corresponding to the size of the contact area may be selected from among the plurality of selection targets.

Accordingly, a selection operation on a selection target can be performed more intuitively.

Further, in the exemplary embodiment, the information processing program further causes the computer of the information processing apparatus to function as a contact position detection unit which detects a position on the contact detection unit contacted by the user, and the determination unit determines which selection target is selected when the contact position detected by the contact position detection unit is in a region between the plurality of objects or in a region (certain region) in which the plurality of objects overlap one another.

Accordingly, a selection operation when there are two or more selection targets can be performed more accurately.

What is claimed is:

1. A computer-readable non-transitory storage medium having stored therein a program which causes a computer of an information processing apparatus including a force detector configured to detect a magnitude of an acceleration applied to the information processing apparatus to: obtain a touch position from a touch input unit and evaluate an input area corresponding to the touch position; and perform one type of predetermined information processing including transforming a displayed object based on a size of the evaluated input area and the magnitude of the detected acceleration, wherein
    in the one type of predetermined information processing, a first parameter, which changes in accordance with the magnitude of the detected acceleration controls a degree of change, in a direction different from a plane, in a first dimension of the displayed object, and a second parameter, which changes in accordance with the size of the evaluated input area controls a degree of change in the plane in at least a second dimension of the displayed object, are controlled temporally parallel to each other.

2. The computer-readable non-transitory storage medium according to claim 1, wherein the computer performs the one type of predetermined information processing based on the size of the evaluated input area and the detected acceleration.

3. The computer-readable non-transitory storage medium according to claim 1, wherein the computer of the information processing apparatus performs the one type of predetermined information processing based on both of the size of the evaluated input area and the detected acceleration.

4. The computer-readable non-transitory storage medium according to claim 1, wherein the computer of the information processing apparatus performs the one type of predetermined information processing based on the size of the evaluated input area, the detected acceleration, and the touch position.

5. The computer-readable non-transitory storage medium according to claim 1, wherein the force detector is a movement sensor which detects a movement of the information processing apparatus and the computer of the information processing apparatus performs the one type of predetermined information processing based on the size of the evaluated input area and the detected movement.

6. The computer-readable non-transitory storage medium according to claim 5, wherein the computer of the information processing apparatus performs the one type of predetermined information processing based on the size of the evaluated input area, a magnitude and a direction of the movement detected by the movement sensor.

7. The computer-readable non-transitory storage medium according to claim 1, wherein the computer of the information processing apparatus performs the one type of predetermined information processing when the size of the evaluated input area and the detected acceleration exceed a predetermined size and a predetermined magnitude, respectively.

8. The computer-readable non-transitory storage medium according to claim 1, wherein the computer of the information processing apparatus performs the one type of predetermined information processing when the touch position is in a certain predefined region.

9. The computer-readable non-transitory storage medium according to claim 1, wherein the computer evaluates the size of the input area based on a number of touches performed on the touch input unit.

10. The computer-readable non-transitory storage medium according to claim 1, wherein the information processing apparatus includes a memory configured to store a table of setting values defining information processes which correspond to respective setting values, and
the computer of the information processing apparatus searches the table of setting values for at least one of a setting value which corresponds to the input area and a setting value which corresponds to a force detection value representing the detected acceleration and performs information processing which corresponds to corresponding setting value.

11. The computer-readable non-transitory storage medium according to claim 1, wherein the program causes the computer of the information processing apparatus to further function as a display controller which reads information from a storage unit and displays the information on a display, and
the one type of predetermined information processing performed by the computer of the information processing apparatus is a process with regard to transformation of the displayed object displayed on the display, and at least one of a transformation range and a degree of transformation of the displayed object is changed based on at least one of the size of the evaluated input area and the detected acceleration.

12. The computer-readable non-transitory storage medium according to claim 11, wherein the computer of the information processing apparatus is further configured to exert a predetermined shape change on the transformation of the displayed object based on at least one of the size of the evaluated input area and the detected acceleration.

13. The computer-readable non-transitory storage medium according to claim 1, wherein another type of predetermined information processing performed by the computer of the information processing apparatus is a process with regard to an in-game effect and at least one of a target range and a magnitude of the in-game effect is changed based on at least one of the size of the evaluated input area and the detected acceleration.

14. The computer-readable non-transitory storage medium according to claim 1, wherein the program causes the computer of the information processing apparatus to further function as a display controller which reads information from a storage device and displays the information on a display, and another type of predetermined information processing performed by the computer of the information processing apparatus is a process with regard to image display of the display, and at least one of a number of display images to transit and a transition speed is changed based on at least one of the size of the evaluated input area and the a detected force.

15. The computer-readable non-transitory storage medium according to claim 1, wherein another type of predetermined information processing performed by the computer of the information processing apparatus is a process with regard to data reproduction, and at least one of a skip time and a speed of the data reproduction are changed based on at least one of the size of the evaluated input area and a detected force.

16. An information processing method comprising step of:
obtaining a touch position from a touch input unit and evaluating a size of an input area corresponding to the touch position;
obtaining a force detection value from a force detection unit which detects a magnitude of an acceleration applied to an information processing apparatus; and
performing one type of predetermined information processing including transforming a displayed object based on the size of the evaluated input area and the magnitude of the acceleration detected by the force detection unit, wherein
in the one type of predetermined information processing, a first parameter, which changes in accordance with the magnitude of the detected acceleration controls a degree of change, in a direction different from a plane, in a first dimension of the displayed object, and a second parameter, which changes in accordance with the size of the evaluated input area controls a degree of change in the plane in at least a second dimension of the displayed object, are controlled temporally parallel to each other.

17. An information processing apparatus comprising:
a display;
an information processing unit comprising at least one processor;
a memory which stores information processed by the information processing unit;
a touch panel configured to accept a touch input; and a force detector configured to detect a magnitude of an acceleration applied to the information processing apparatus, wherein the at least one processor of the information processing unit evaluates a size of an input area corresponding to a touch position and performs one type of predetermined information processing including transforming a displayed object based on the size of the evaluated input area and the magnitude of the acceleration detected by the force detector, wherein
in the one type of predetermined information processing, a first parameter, which changes in accordance with the magnitude of the detected acceleration controls a degree of change, in a direction different from a plane, in a first dimension of the displayed object, and a second parameter, which changes in accordance with the size of the evaluated input area controls a degree of change in the plane in at least a second dimension of the displayed object, are controlled temporally parallel to each other.

* * * * *